(12) United States Patent
Renard

(10) Patent No.: US 6,910,769 B2
(45) Date of Patent: Jun. 28, 2005

(54) BIFOCAL SPECTACLES FOR COMPUTER USERS AND DISPLAY DEVICE THEREFOR

(76) Inventor: Paula A. Renard, 47 Bundy Cir., Buellton, CA (US) 93427

( * ) Notice: Subject to any disclaimer, the term of this patent is extended or adjusted under 35 U.S.C. 154(b) by 0 days.

(21) Appl. No.: 10/345,025

(22) Filed: Mar. 24, 2003

(65) Prior Publication Data
US 2003/0189687 A1 Oct. 9, 2003

Related U.S. Application Data
(60) Provisional application No. 60/370,309, filed on Apr. 5, 2002, and provisional application No. 60/370,310, filed on Apr. 5, 2002.

(51) Int. Cl.[7] .............................. G02C 7/10; G02C 7/16; G02C 9/00
(52) U.S. Cl. ............................. 351/164; 351/45; 351/47
(58) Field of Search ..................... 351/45–47, 163–165, 351/168–172, 233

(56) References Cited

U.S. PATENT DOCUMENTS

| | | | | |
|---|---|---|---|---|
| 798,435 A | * | 8/1905 | Mayer | 351/168 |
| 4,867,553 A | * | 9/1989 | Frieder | 351/172 |
| 4,898,459 A | * | 2/1990 | Eriksson | 351/46 |
| 5,675,398 A | * | 10/1997 | Moore | 351/45 |

* cited by examiner

Primary Examiner—Scott J. Sugarman
(74) Attorney, Agent, or Firm—Michael G. Petit

(57) ABSTRACT

A polyvinyl display device for bifocal computer/reading spectacles. The display device enables a person to identify a pair of spectacles having the correct optical center to match the wearer's pupillary separation. The present invention includes, in combination, a pair of spectacles having two near focal powers and a new type of display mechanism that allows the purchaser to choose not only the correct power needed, but also the correct pair of glasses to match the user's pupillary distance (PD). Optical centers of finished reading glasses are marked, then a display device including an opaque polyvinyl static cling film having two, preferably round, holes therein is placed onto the glasses such that the holes in the film overlie the optical centers. When the user dons the glasses, if a solid round area is viewed, the spectacles have the correct size for the user's PD. If a figure eight or two holes is viewed, the PD is too wide. If the user views the outside edges, the PD is too narrow. By visual observation, the consumer can find the correctly sized reading glasses. The reading glasses preferably are fabricated in three different PD's, Narrow, 55–58 mm, Medium, 59–62 mm and Wide, 63–66 mm.

8 Claims, 1 Drawing Sheet

BIFOCAL SPECTACLES FOR COMPUTER USERS AND DISPLAY DEVICE THEREFOR

This application claims the benefit of U.S. Provisional Application Nos. 60/370,309, filed Apr. 5, 2002, and 60/370,310, filed Apr. 5, 2002.

BACKGROUND OF THE INVENTION

1. Field of the Invention

The present invention relates in one aspect to a display device for non-prescription reading glasses, and in another aspect, to bifocal reading glasses comprising two focal distances for use while using a computer, workspace, reading the newspaper, or other activities at intermediate or about "arms distance", and close up for normal reading distance. The display device adheres to the lenses of the glasses, as, for example, by static cling, and has viewing holes matching the optical centers of the spectacles.

2. Prior Art

OTC reading glasses have been available for many years. Most have been single vision half-eye designs to enable the wearer to look over the top for distance use, and also different straight top bifocal designs to allow the wearer to view distant images through a plano (zero power) segment without the need for removing the glasses. The problem with current over-the-counter (OTC) reading glasses is that they are not made with customized pupillary distance (PD's) as is done in custom-made spectacles. The PD of prior art bifocal glasses, as currently manufactured, depends on the geometric or mechanical center of the frame itself, wherein the optical center of the lens is centered in the geometric center of the frame. Large frames have large distances between the optical centers of the lenses. A person with a narrow pupillary distance (PD) measurement of, for example, 56 mm., could be wearing OTC reading glasses with 66 mm. optical centers. This creates up to 2 diopters of induced prism effect that would cause eyestrain and discomfort and would be outside of ANSI standards for ophthalmic lenses.

As technology has changed, the need for an additional focal power has become a necessity. There is, therefore, a need for glasses wherein the total reading power of the spectacles is split into the two different sections of the lens. This feature is not currently available in OTC spectacles.

As the age of the population increases, many people with otherwise healthy eyes are becoming presbyopic: a loss of the eyes' ability to see objects close up such as small print and reading materials. Presbyopes currently must get an eye exam in order to acquire glasses for computer use if they want more than one power in their glasses, because this type of spectacles have not been available OTC, and need to be custom made.

A common complaint of presbyopes is that while they don't need any corrective lenses for distance use, they do need correction for near and mid-range use. Such users report that currently available OTC reading glasses are not satisfactory for either computer use or for mid-range viewing (an area of circumference less than an arms distance around wearer). Presbyopes use a lower power reading glass for the computer, and a stronger power reader for normal reading distance, because current OTC reading glasses only come in a single reading power. The computer display is generally a slightly farther distance for the user than normal reading distance, requiring just slightly less plus power correction, causing eyestrain and fatigue. The reading power is too strong and the person at a computer needs to get their eyes closer to the video display terminal than is comfortable.

Currently, computer glasses are prescribed by ophthalmologists and optometrists, usually splitting ½ of the reading power and putting it on the distance portion of the lens (for use at intermediate distance) and then cutting the power of the bifocal segment by ½, i.e., the top section of the bifocal lens is +1.50 D and the bifocal add segment is a +1.50 D for a total reading power of +3.00.

The "Continuum" progressive computer lens, manufactured by Sola International, takes the total add power needed for reading and then subtracts 1.00 diopter of power to lengthen the focal distance to accommodate use at a computer and workstation in the upper section of the lens. The Continuum lens is designed to be fitted by an optician similarly to a progressive multi-focal design.

SUMMARY

The present invention discloses improved OTC reading glasses utilizing a straight-top bifocal design, with the added ability for the consumer to choose glasses having the proper pupillary distance for greater comfort and less eyestrain. By having a simple straight-top bifocal design, there are only two areas of focal power instead of several areas such as is provided in progressive designs. The present invention reduces or eliminates the occurrence of the problem of "non-adapt" that is common with the Sola Continuum computer designs and other progressive lenses.

In accordance with one aspect of the present invention, the optical center of each lens comprising a pair of OTC computer/reading glasses are marked at the factory, then a polyvinyl (PVC) display device is releasably affixed to the glasses such that viewing holes in the display device are spaced to correspond to and overlie the position of the marked optical centers on the lenses. The display device enables the purchaser to check the power of the glasses through the holes in the PVC display device in order to confirm that the power and PD of the glasses is correct. The polyvinyl display device also serves to protect the outside surface of lenses from scratches while on display.

The features of the invention believed to be novel are set forth with particularity in the appended claims. However the invention itself, both as to organization and method of operation, together with further objects and advantages thereof may be best understood by reference to the following description taken in conjunction with the accompanying drawings.

DESCRIPTION OF THE PREFERRED EMBODIMENTS

Figure 1:
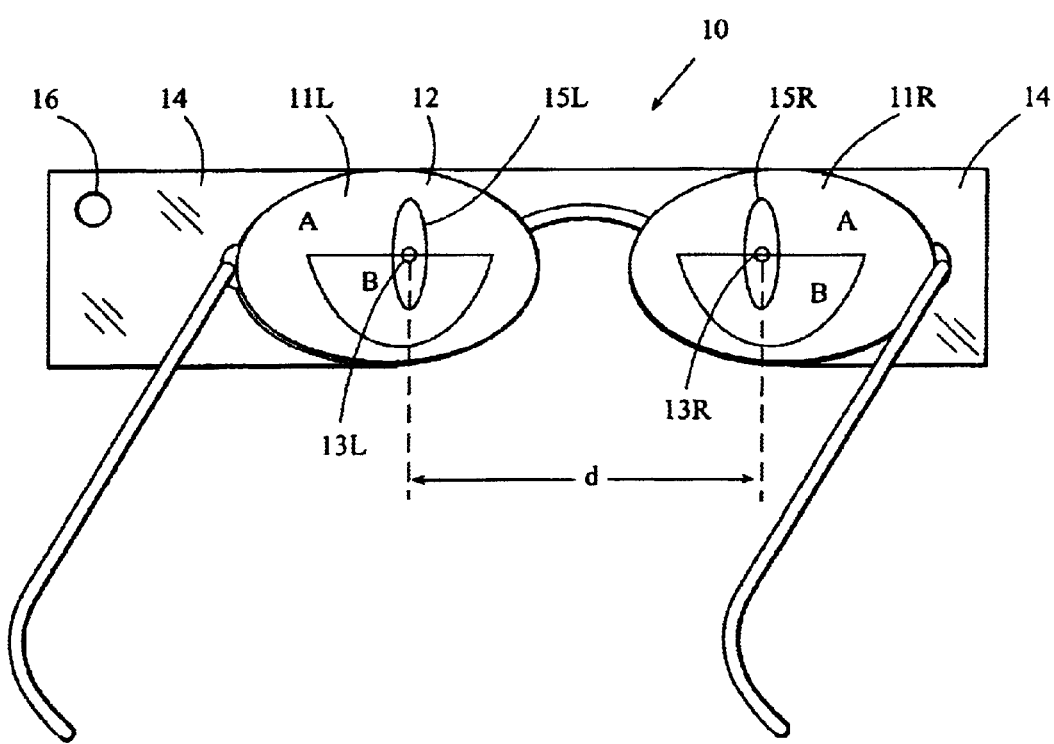
FIG. 1 is a rear perspective view of a pair of bifocal glasses having a mask attached thereto, the spaced holes in the mask being disposed to overlie the optical centers of the respective lenses in accordance with the present invention.

OTC multi-function bifocal computer glasses in accordance with the present invention are designed for that segment of the population that has no need for corrective lenses other than reading glasses, but also desires, in addition, a slightly longer focal distance for visual comfort while at a workstation, computer, reading the newspaper, playing cards, etc. Accordingly, glasses in accordance with the present invention are preferably provided in a variety of powers. The correct power for intermediate viewing distances is indicated at A in FIG. 1. The power of the reading segment B is higher than A and is suitable for close reading distances. Bifocal glasses having a suitable combination of powers is as follows:

| Intermediate(A) | Segment power(B) | Total reading power |
|---|---|---|
| +0.25 | +1.00 | +1.25 |
| +0.50 | +1.00 | +1.50 |
| +0.75 | +1.00 | +1.75 |
| +1.00 | +1.00 | +2.00 |
| +1.25 | +1.00 | +2.25 |
| +1.50 | +1.00 | +2.50 |
| +1.75 | +1.00 | +2.75 |
| +2.00 | +1.00 | +3.00 |

With reference now to FIG. 1, a pair of bifocal glasses 10 has a left lens 11L and a right lens 11R supported by a frame 12. Each lens 11L and 11R has an optical center 13L and 13R respectively spaced by a distance d. A polyvinyl mask 14 having a pair of holes 15L and 15R therein, the center of the holes being spaced from each other by a distance d, is adhered to the left lens 11L and the right lens 11R such that the centers of the holes 15L and 15R overlie the optical centers 13L and 13R respectively. The polyvinyl mask 14 is preferably attached to the lenses by static electrical attraction (static cling), but may comprise adhesive means (not shown) operable for releasably attaching the polyvinyl mask 14 to the lenses of the glasses. The mask 14 may further include display attachment means 16 operable for releasably attaching the glasses to a display.

When a wearer dons the glasses 10, if the holes 15L and 15R, which are preferably either elongate slots (as shown) or circular holes, are spaced such that the distance d is equal to the interpupillary spacing of the user, greatest visual acuity will be experienced by the wearer indicating the correct lens spacing for the particular user.

While particular embodiments of the present invention have been illustrated and described, it would be obvious to those skilled in the art that various other changes and modifications can be made without departing from the spirit and scope of the invention. For example, the PVP display device can comprise any thin, opaque film. In addition, the PVP mask can be attached to the lenses by electrostatic attraction or adhesive means. Further, the PVP mask can be used to determine the correct interpupillary distance for a particular user with single focus, bifocal, trifocal or continuous focal length glasses. It is therefore intended to cover in the appended claims all such changes and modifications that are within the scope of this invention.

What I claim is:

1. Eyeglasses having left and right lenses supported by and nonadjustably affixed to a frame wherein each of said lenses has an optical center spaced one from the other by a first fixed distance, and a display device releasably attached to said left and right lenses, said display device comprising an optically opaque film having unitary construction and first and second holes therein, said holes being separated by a second fixed distance wherein said second fixed distance is equal to said first fixed distance and wherein said first and second holes overlie said optical centers of said left and said right lenses respectively.

2. The eyeglasses of claim 1 wherein the eyeglasses are multifocal.

3. The eyeglasses of claim 1 wherein the holes are circular.

4. The eyeglasses of claim 1 wherein the holes are elongate slots.

5. The eyeglasses of claim 2 wherein the holes are circular.

6. The eyeglasses of claim 2 wherein the holes are elongate slots.

7. The eyeglasses of claim 1 wherein said display device includes display rack attachment means operable for removably attaching said display device to a display rack.

8. The eyeglasses of claim 2 comprising a lens having an upper segment having a first diopter adapted to provide comfortable viewing of an image disposed 1.5–3 feet from a viewer, and a lower reading segment having a second diopter greater than said first diopter and adapted to provide comfortable viewing of an image disposed 1–1.5 feet from a viewer.

\* \* \* \* \*